(12) United States Patent
Shah

(10) Patent No.: US 7,311,825 B2
(45) Date of Patent: Dec. 25, 2007

(54) POLYMER MODIFIED POROUS SUBSTRATE FOR SOLID PHASE EXTRACTION

(75) Inventor: Vipul J. Shah, West Covina, CA (US)

(73) Assignee: Varian, Inc., Palo Alto, CA (US)

( * ) Notice: Subject to any disclaimer, the term of this patent is extended or adjusted under 35 U.S.C. 154(b) by 295 days.

(21) Appl. No.: 11/120,003

(22) Filed: May 2, 2005

(65) Prior Publication Data

US 2006/0247362 A1    Nov. 2, 2006

(51) Int. Cl.
B01D 15/08    (2006.01)

(52) U.S. Cl. ............... 210/198.2; 210/502.1; 210/635; 210/656

(58) Field of Classification Search ............... 210/635, 210/656, 198.2, 502.1; 502/401, 402, 439; 524/494, 555

See application file for complete search history.

(56) References Cited

U.S. PATENT DOCUMENTS

| | | | |
|---|---|---|---|
| 4,017,528 A | | 4/1977 | Unger et al. |
| 4,512,897 A | | 4/1985 | Crowder, III et al. |
| 5,035,803 A | * | 7/1991 | Cohen .................... 210/656 |
| 5,328,758 A | | 7/1994 | Markell et al. |
| 5,616,407 A | | 4/1997 | Fritz et al. |
| 5,618,438 A | | 4/1997 | Fritz et al. |
| 5,738,790 A | | 4/1998 | Hagen et al. |
| 5,906,796 A | | 5/1999 | Blevins et al. |
| 6,200,533 B1 | | 3/2001 | Blevins et al. |
| 6,322,695 B1 | | 11/2001 | Lee et al. |
| 6,387,974 B1 | * | 5/2002 | Deissler et al. ............. 521/150 |
| 6,723,157 B2 | | 4/2004 | Tsuda et al. |
| 6,749,749 B2 | | 6/2004 | Xie et al. |
| 6,759,442 B2 | | 7/2004 | Takahashi et al. |

(Continued)

FOREIGN PATENT DOCUMENTS

EP    0432438 B1    2/1994

(Continued)

OTHER PUBLICATIONS

Article by Corradini, et al, Entitled "Synthesis of a Polymeric-Based Stationary Phase for Carbohydrate Separation by High-pH Anion-Exchange Chromatography with Pulsed Amperometric Detection," Published by Journal of Chromatography A., vol. 685 (1994) pp. 213-220.

(Continued)

*Primary Examiner*—Ernest G. Therkorn
(74) *Attorney, Agent, or Firm*—Cynthia Moore; Bella Fishman

(57) ABSTRACT

A polymer modified porous substrate for solid phase extraction or chromatography, comprising a porous substrate and a polymeric monolith formed thereon, wherein the polymeric monolith comprises $C_{5-10}$ monocyclic or bicyclic aryl or heteroaryl, optionally substituted with $-L-Q_p-R_q$; where q is 0-3, p is 0-5, Q is $-NRC(O)-$, $-C(O)NR-$, $-OC(O)NR-$, $-OC(O)R-$, $-NRC(O)O-$, $-NRC(O)NR-$, $-NCO$, $-CHOHCHOH-$, $CH_2OCH_2O-$, $-(CH_2CH_2O)_s-$, $-(CH_2CH_2CH_2O)_s-$, $-C(O)-$, $-C(O)O-$, $-CH_2C(O)CH_2-$, $-S-$, $-SS-$, $-CHOH-$, $-O-$, $-SO-$, $-SO_2-$, $-SO_3-$, $-OSO_3$, $-SO_2NR-$, $-NR_q-$, and $-NR_q^+-$, $-CN$, $-NC$, $-CHOCH-$, $-NHC(NH)NH-$, $-NO_2$, $-NO$, $-OPO_3-$, $-OH$; and R is hydrogen, $C_{5-10}$ monocyclic or bicyclic aryl or heteroaryl, $C_{1-12}$ branched, unbranched, or cyclic hydrocarbyl; L is a bond or a $C_{1-12}$ branched, unbranched, or cyclic hydrocarbyl. Methods of preparing and using the polymer modified porous substrates are disclosed.

10 Claims, 5 Drawing Sheets

U.S. PATENT DOCUMENTS

| | | | |
|---|---|---|---|
| 2002/0042487 A1* | 4/2002 | Deissler et al. | 526/336 |
| 2003/0229191 A1 | 12/2003 | Kallury et al. | |
| 2004/0020855 A1* | 2/2004 | Allington et al. | 210/656 |
| 2004/0203149 A1* | 10/2004 | Childs et al. | 435/404 |
| 2006/0247361 A1* | 11/2006 | Shah | 524/494 |

FOREIGN PATENT DOCUMENTS

| | | |
|---|---|---|
| EP | 0498557 B1 | 3/1996 |
| EP | 1 159 995 A2 | 12/2001 |
| WO | WO 2004/106914 A1 | 12/2004 |

OTHER PUBLICATIONS

Article by Premstaller, et al, Entitled "High-Performance Liquid Chromatography-Electrospray Ionization Mass Spectrometry of Single- and Double-Stranded Nucleic Acids Using Monolithic Capillary Columns," Published by Institute of Analytical Chemistry and Radiochemistry, Sep. 15, 2000, vol. 72, No. 18, pp. 4386-4393.

Article by Okay, O., Entitled "Macroporous Copolymer Networks," Published by Progress in Polymer Science 25 (2000) pp. 711-779.

Article by Merhar, et al, Entitled "The Structure of a Poly(styrene-CO-divinylbenzene) Monolithic Chromatographic Support and its Effect on the Chromatographic Properties," Published by Materiali in Tehnologije 36 (2002) 3-4, p. 163-167, ISSN 1580-2949.

Article by Tsuda, et al, Entitled "Preparation of a New Type of Fiber Adsorbent Attached with Silica Microparticles," Published by Analytical Sciences, Jul. 2004, vol. 20, pp. 1061-1064.

* cited by examiner

POLYMER MODIFIED POROUS SUBSTRATE FOR SOLID PHASE EXTRACTION

CROSS-REFERENCE TO RELATED APPLICATIONS

This application is related to but does not claim priority to Ser. No. 11/119,840 entitled POLAR FUNCTIONALIZED POLYMER MODIFIED POROUS SUBSTRATE FOR SOLID PHASE EXTRACTION, filed on May 2, 2005.

FIELD OF THE INVENTION

This invention relates generally to devices and methods for analytical and preparatory separations and the like.

BACKGROUND OF THE INVENTION

The use of polymeric sorbents is known in the area of analytical and preparative separations. The porous structure can be controlled by choice of monomers, amount of crosslinking copolymer, polymerization temperature, and the amount and type of porogenic solvent. These parameters and their affect on monolith pore structure are reviewed in detail in Okay, O. *Prog. Polym. Sci.* (2000) 25:711-779.

One commonly used polymeric monolith is formed from the free radical polymerization of styrene and divinylbenzene. Many examples of styrene/divinylbenzene polymers are known in the art, and have been applied in the areas of solid phase extraction and chromatography. For example, Premstaller, A. (2000) *Anal. Chem.* 72:4386 describes the performance of a monolithic chromatography bed comprising poly(styrene divinylbenzene) and compared it with a column packed with micropellicular poly(styrene divinylbenzene) polymer beads. A monolithic poly(styrene-divinylbenzene) was formed in capillary tubing and used to separate double stranded nucleic acids in preparation for electrospray ionization mass spectrometry. The monolithic column exhibited an improvement in column performance relative to a column packed with polymer beads.

Merhar, M. et al. (2002) *Materiali in Tehnologije* 36:163 describe a representative polymer monolithic disk and its use to separate a mixture of macromolecules (proteins).

US 2003/0229191 to Kallury describes a polymeric sorbent comprising a polymeric backbone adapted to facilitate one or more interactions selected from the groups consisting of a dipolar interaction and a hydrophobic interaction and an amide functionality associated with polymeric backbone and adapted to undergo one or more interactions selected from the group consisting of proton accepting, proton donating and dipolar interactions, and exhibiting a strong capacity for retention of polar molecules. The sorbent can be associated with supports including disks, membranes, and syringe barrel cartridges for sample pretreatment.

U.S. Pat. No. 5,616,407 to Fritz describes a functionalized macroporous poly(styrene divinylbenzene) particle comprising ionic functional groups for adsorbing analytes. Similarly, EP 0758261B1 and U.S. Pat. No. 5,618,438 to Fritz describe the use of the aforementioned macroporous poly(styrene divinylbenzene) particle in a solid phase extraction medium comprising a fibrous matrix and sorptive particles enmeshed in the matrix in a weight ratio of sorptive particles to fibrous matrix of 40:1 to 1:4. EP 498557A1 describes a method for preparing a solid phase extraction medium comprising a PTFE fibril matrix and sorptive particles enmeshed in said matrix and a method for isolating an analyte. The solid phase extraction medium is prepared by blending the particles with a PTFE emulsion and subjected to mixing to cause the fibrillation of the PTFE particles, and calendared to form a calendered sheet. The particles are described as being separate from each other and isolated in a PTFE fibril cage that restrains the particle.

U.S. Pat. No. 5,738,790 to Hagen describes a solid phase extraction medium comprising a porous nonwoven fibrous matrix comprising PTFE and blown microfibers and sorptive or reactive hydrophobic siliceous molecular sieve particles enmeshed in said matrix in a weight ration of 40:1 to 1:40.

Variations on the monomers that can be used in the preparation of polymeric sorbents have also been investigated. For example, EP 1159995 and U.S. Pat. No. 6,759,442 to Takahashi describe a packing material for solid phase extraction of hydrophobic and ionic substances, reportedly having hydrophobicity and an ion exchange group. The packing material is described as a particle obtained by copolymerizing a hydrophobic monomer (A) and a hydrophilic monomer (B) and introducing thereinto an ion exchange group, in which the ion exchange group is introduced allegedly without impairing the hydrophobic site.

U.S. Pat. No. 6,322,695 to Lee describes a porous resin comprising crosslinked polymer particles penetrated by channels for solid phase extraction. The polymeric particles are said to feature a hydrophobic component, at least one hydrophilic component and at least one ion exchange functional group. In certain embodiments, the hydrophobic monomer is divinylbenzene, the hydrophilic monomer is N-vinylpyrrolidone, and the copolymer is a sulfonated poly (divinylbenzene-co-N-vinylpyrrolidone).

U.S. Pat. No. 6,749,749 to Xie describes the preparation of permeable polymeric monolithic materials in column casings wherein the application of pressure allegedly avoids wall effects and swelling. In particular embodiments, filler materials such as polymer rods or silica beads are used as a framework for the polymer and allegedly provide greater mechanical strength.

Tsuda et al. in U.S. Pat. No. 6,723,157 and (2003) *Analytical Sciences* 20, 1061 describe the preparation of a type of fiber adsorbent having attached silica microparticles for adsorbing gaseous toluene at low concentrations. The silica microparticles are reportedly prepared by polymerizing silica oligomers under alkaline conditions and fixing them onto glass fibers, which were woven into a glass fiber. The surface of the silica microparticles was chemically modified by bonding $C_{18}$ phases.

EP 0432438 describes molded adsorbents comprising a mixture of adsorbent particles, fine plastic particles and reinforcing fibers. The adsorbent is activated carbon, silica, alumina, or zeolites. U.S. Pat. No. 4,512,897 to Crowder describes a molecular separation column for effecting the differential distribution between two phases, the column containing a substantially homogenous solid stationary phase which comprises a porous matrix of fiber having particulate immobilized therein.

However, the polymeric sorbents described in the art are provided as particles which must be incorporated into a sorbent bed or enmeshed in fiber networks. The resultant articles are not convenient and inexpensive to manufacture, nor do they provide ease of use in solid phase extraction applications. The solid phase adsorption characteristics are limited, and the sorbents do not provide good retention of both polar and nonpolar analytes. In addition, the solid phase extraction media do not provide recovery of analytes in small eluant volumes with superior flow rates, allowing fast and efficient use of time, labor and solvents in analytical applications.

SUMMARY OF THE INVENTION

Accordingly, it is a primary object of the invention to address the aforementioned needs in the art by providing a polymer modified porous substrate for solid phase extraction or chromatography.

It is an additional object of the invention to provide improved methods for solid phase extraction.

It is an additional object of the invention to provide improved methods for preparing solid phase extraction media.

Accordingly, a polymer modified porous substrate for solid phase extraction or chromatography is provided, comprising a porous substrate and a polymeric monolith formed thereon, wherein the polymeric monolith has the formula

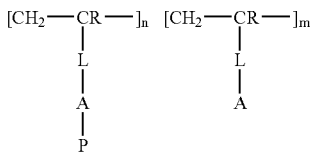

wherein A is selected from $C_{5-10}$ monocyclic or bicyclic aryl or heteroaryl, optionally substituted with -L-$Q_p$-$R_q$; q is 0-3; p is 0-5, preferably 0-2; Q is —NRC(O)-(amide), —C(O)NR-(carbamyl), —OC(O)NR-(carbamate), —OC(O)R(alkyloxy), —NRC(O)O-(urethane), —NRC(O)NR-(carbamide or urea), —NCO(isocyanate), —CHOHCHOH-(diol), CH$_2$OCHCH$_2$O-(glycidoxy), —(CH$_2$CH$_2$O)$_s$-(ethoxy), —(CH$_2$CH$_2$CH$_2$O)$_s$-(propoxy), —C(O)-(carbonyl), —C(O)O-(carboxy), —CH$_2$C(O)CH$_2$-(acetonyl), —S-(thio), —SS-(dithio), —CHOH—, —O-(ether), —SO-(sulfinyl), —SO$_2$-(sulfonyl), —SO$_3$-(sulfonic acid), —OSO$_3$ (sulfate), —SO$_2$NR-(sulfonamide), —NR$_q$—, (amines), and —NR$_q^+$—, where R is not H (quaternary amines), —CN(nitrile), —NC(isonitrile), —CHOCH-(epoxy), —NHC(NH)NH-(guanidino), —NO$_2$ (nitro), —NO(nitroso), —OPO$_3$-(phosphate), —OH(hydroxy), and s is 1-12; and R is hydrogen, $C_{5-10}$ monocyclic or bicyclic aryl or heteroaryl, $C_{1-12}$ branched, unbranched, or cyclic hydrocarbyl;

P is

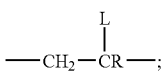

L is a bond or a $C_{1-12}$ branched, unbranched, or cyclic hydrocarbyl; and wherein the order of [—CH$_2$—CR-L-A-P] and [—CH$_2$—CR-L-A] is random, block or a combination thereof. Preferably, n/m is from 0 to 1000 or m/n is from 0 to 1000; The porous substrate can be in the form of a monolith, agglomerated particles, or woven or nonwoven fibers. A preferred porous substrate is a glass fiber monolith. The polymeric monolith can optionally be functionalized with a polar functionality after the polymeric monolith is formed on the porous substrate to provide desired chemical surface characteristics such as wettability, or a desired analyte retention.

Methods for preparing the polymer modified porous substrate generally comprise: (a) contacting a porous substrate with a solution comprising one or more hydrophobic monomers, a porogenic solvent and a polymerization initiator; and (b) heating the porous substrate and retained solution in the absence of oxygen to polymerize the one or more monomers onto the porous substrate. In certain embodiments, the hydrophobic monomers are crosslinkable monomers, uncrosslinkable monomers, or combinations thereof. It is preferred that the hydrophobic monomer has the formula

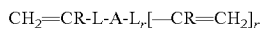

where L is a bond or a $C_{1-12}$ branched, unbranched, or cyclic hydrocarbyl; A is a $C_{5-10}$ monocyclic or bicyclic aryl or heteroaryl, optionally substituted with $C_{1-12}$ branched or unbranched hydrocarbyl, halo, and r is 0 or 1. Preferably, the uncrosslinkable monomer is selected from vinyl or allyl substituted $C_{5-10}$ monocyclic or bicyclic aryl or heteroaryl, optionally substituted with $C_{1-12}$ branched or unbranched hydrocarbyl, halo, or combinations thereof. Preferably, the crosslinkable monomer is selected from divinyl- or diallyl-substituted $C_{5-10}$ monocyclic or bicyclic aryl or heteroaryl moieties, optionally substituted with $C_{1-12}$ branched or unbranched hydrocarbyl, halo, or combinations thereof.

The method can further comprising treating the polymer modified porous substrate to introduce a polar functionality selected from —NRC(O)—, —C(O)NR—, —OC(O)NR—, —OC(O)R, —NRC(O)O—, —NRC(O)NR—, —NCO, —CHOHCHOH—, CH$_2$OCHCH$_2$O—, —(CH$_2$CH$_2$O)$_s$—, —(CH$_2$CH$_2$CH$_2$O)$_s$—, —C(O)—, —C(O)O—, —CH$_2$C(O)CH$_2$—, —S—, —SS—, —CHOH—, —O—, —SO—, —SO$_2$—, —SO$_3$—, —OSO$_3$, —SO$_2$NH—, —SO$_2$NR—, —NR$_q$—, and —NR$_q^+$—, —CN, —NC, —CHOCH—, —NHC(NH)NH—, —NO$_2$, —NO, —OPO$_3$—, —OH; wherein s is 1-12; q is 0-3; and R is hydrogen, $C_{5-10}$ monocyclic or bicyclic aryl or heteroaryl, $C_{1-12}$ branched, unbranched, or cyclic hydrocarbyl. The porous substrate can be in the form of a monolith, agglomerated particles, or woven or nonwoven fibers.

In an additional embodiment, a method is provided for preparing an amide functionalized polymer modified porous substrate comprising: (a) contacting a porous substrate with a solution comprising one or more hydrophobic monomers, a porogenic solvent and a polymerization initiator; (b) heating the porous substrate and retained solution in the absence of oxygen to polymerize the one or more monomers onto the porous substrate to form the polymer modified porous substrate, (c) nitrating the polymer modified porous substrate to form the nitrated polymer modified porous substrate; (d) reducing the nitrated polymer modified porous substrate to form the aminated polymer modified porous substrate; and (e) acylating the aminated polymer modified porous substrate with an acid, an acid chloride or an acid anhydride to form the amidated polymer modified porous substrate. In one embodiment, the method can further comprise sulfonating the amidated polymer modified porous substrate. In an additional embodiment, the method can further comprise treating the aminated or amidated polymer modified porous substrate to form a quaternary amine functionalized polymer modified porous substrate.

In an additional aspect, methods are provided for isolating an analyte, comprising (a) conditioning a polymer modified porous substrate with an organic solvent and optionally an aqueous solvent, or mixtures thereof; (b) adsorbing analytes present in a sample to be analyzed to the conditioned polymer modified porous substrate; and (c) eluting the adsorbed analytes from the polymer modified porous substrate with an organic solvent, an aqueous solvent, or mixtures thereof.

In another aspect, a method is provided for performing a chromatographic separation of analytes, comprising a) providing a polymer modified porous substrate disposed in a chromatography apparatus; b) conditioning said polymer modified porous substrate with an organic solvent, aqueous solution, or mixtures thereof; c) contacting said polymer modified porous substrate with a solution comprising one or more analytes; d) passing a mobile phase comprising an organic solvent, a aqueous solution, or mixtures thereof, through said polymer modified porous substrate; and e) eluting one or more analytes from the polymer modified porous substrate.

In an additional embodiment, devices for performing solid phase extraction or chromatography are provided, comprising a polymer modified porous substrate associated with a support. Preferably, the support is a syringe barrel cartridge, a chromatography column, a microfluidics platform, one or more additional membranes, a pipette tip or a multiwelled plate Additional objects, advantages and novel features of the invention will be set forth in part in the description which follows, and in part will become apparent to those skilled in the art upon examination of the following, or may be learned by practice of the invention.

DETAILED DESCRIPTION OF THE INVENTION

I. Definitions and Overview

Figure 1:
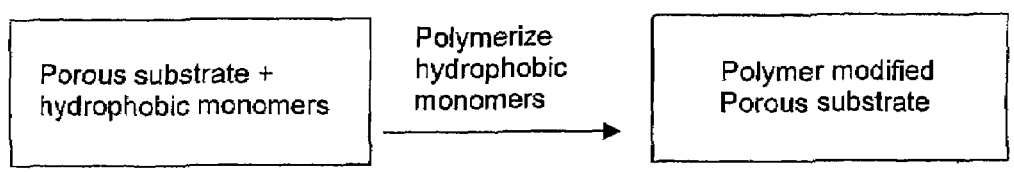
FIG. 1 illustrates a schematic for the preparation of a polymer modified porous substrate.

Before the present invention is described in detail, it is to be understood that unless otherwise indicated this invention is not limited to specific analytes, solvents, chemistries, or the like, as such may vary. It is also to be understood that the terminology used herein is for the purpose of describing particular embodiments only and is not intended to limit the scope of the present invention.

It must be noted that as used herein and in the claims, the singular forms "a," "and" and "the" include plural referents unless the context clearly dictates otherwise. Thus, for example, reference to "a solvent" includes two or more solvents; reference to "an analyte" includes two or more analytes, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

As used herein, the term "adsorb" and grammatical derivatives thereof, means a surface phenomena wherein an analyte becomes reversibly associated with the surface of a polymeric sorbent by physically interacting with the surface molecules. The association can be, for example, via any non-covalent mechanism such as van der Waal's forces, dipole-dipole interactions, dipole-induced dipole or dispersive forces, via hydrophobic interactions or hydrogen donor or acceptor interactions, or including electrostatic or ion exchange interactions.

As used herein, the term "analyte" means any molecule to be characterized, identified or quantitated in a sample of biological, organic, synthetic, natural or inorganic origin. For example, a candidate therapeutic compound or metabolite thereof can be an analyte, and can be present in, for example, a blood plasma sample, saliva, urine, drinking water, mixture of synthetic or natural products, or environmental sample. An analyte can exhibit any polarity, from nonpolar to polar.

As used herein, the term "monolith" means a continuous structure, including for example, honeycomb structures, foams, and fibers, including fibers woven into fabrics or made into non-woven mats or thin paper-like sheets. Foams generally exhibit a sponge-like structure.

As used herein, the term "substrate" refers to a porous substantially insoluble material that is stable to washing or reaction conditions, such as those encountered during sample preparation and/or synthetic procedures, including solvent extraction steps and in situ reaction steps.

The terms "polar," "nonpolar" and "polarity" refer generally to the partition coefficient P of a compound of interest, which is the ratio of the equilibrium concentrations of the compound in an organic phase (e.g., octanol) relative to an aqueous phase (e.g., water). As used herein, a polar compound is generally characterized as having a log P value less than 2.0, while a nonpolar compound is generally characterized as having a log P value greater than about 2.0.

The term "polar functionality" generally refers to the following chemical groups: —NRC(O)-(amide), —C(O)NR-(carbamyl), —OC(O)NR-(carbamate), —OC(O)R-(alkyloxy), —NRC(O)O-(urethane), —NRC(O)NR-(carbamide or urea), —NCO(isocyanate), —CHOHCHOH-(diol), $CH_2OCHCH_2O$-(glycidoxy), —$(CH_2CH_2O)_s$-(ethoxy), —$(CH_2CH_2CH_2O)_s$-(propoxy), —C(O)-(carbonyl), —C(O)O-(carboxy), —$CH_2C(O)CH_2$-(acetonyl), —S-(thio), —SS-(dithio), —CHOH—, —O-(ether), —SO-(sulfinyl), —$SO_2$-(sulfonyl), —$SO_3$-(sulfonic acid), —$OSO_3$ (sulfate), —$SO_2$NMe-(sulfonamide), —$NR_q$—, (amines), and —$NR_q^+$—, where R is not H (quaternary amines), —CN (nitrile), —NC(isonitrile), —CHOCH-(epoxy), —NHC(NH)NH-(guanidino), —$NO_2$ (nitro), —NO(nitroso), —$OPO_3$-(phosphate), —OH(hydroxy), where s is greater than 1, or more preferably 1-12; and R is hydrogen, $C_{5-10}$ monocyclic or bicyclic aryl or heteroaryl, $C_{1-12}$ branched, unbranched, or cyclic hydrocarbyl.

The term "hydrocarbyl" is used in its conventional sense to refer to a hydrocarbon group containing carbon and hydrogen, and may be straight or branched chain aliphatic, alicyclic or aromatic, or may contain a combination of aliphatic, alicyclic and/or aromatic moieties. Aliphatic and alicyclic hydrocarbyl may be saturated or they may contain one or more unsaturated bonds, typically double bonds. When a hydrocarbyl residue having a specific number of carbons is named, all geometric isomers having that number of carbons are intended to be encompassed; thus, for example, "butyl" is meant to include n-butyl, sec-butyl, isobutyl and t-butyl; "propyl" includes n-propyl and isopropyl.

The present inventors have surprisingly discovered that adsorbent polymers can be formed directly on porous substrates to form a polymer modified porous substrate which provides a superior medium for solid phase extraction or chromatography. The polymer modified porous substrates are simple to use and manufacture, and provide a significant advance in the art of solid phase extraction of analytes. When the polymer is ftinctionalized with one or more polar moieties, superior retention of polar analytes and methods for recovering analytes of particular polarities are provided. The polymer monolith formed on the porous substrate provides superior results in comparison with prior art devices described as comprising entrapped polymeric particles. The polymer modified porous substrate also provides improved methods of isolating analytes and performing solid phase extraction.

The components and uses of the polymer modified porous substrates are described in greater detail below.

II. Polymers

The polymeric monolith which is formed on the polymer modified porous substrate comprises hydrophobic moieties to adsorb nonpolar compounds, and in certain embodiments, comprises one or more polar functionalities to provide enhanced retention of polar compounds. The polymeric monolith has the formula

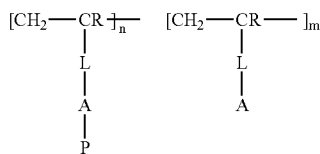

wherein A is selected from $C_{5-10}$ monocyclic or bicyclic aryl or heteroaryl; L is a bond or a $C_{1-12}$ branched, unbranched, or cyclic hydrocarbyl;

P is

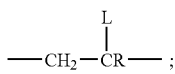

and wherein the order of [—$CH_2$—CR-L-A-P] and [—$CH_2$—CR-L-A] is random, block or a combination thereof. The moiety P provides a crosslinked polymer bonded with two different polymeric backbones. The polymeric monolith is formed from the polymerization of one or more hydrophobic monomers, which can be crosslinkable monomers, uncrosslinkable monomers, or combinations thereof. When only crosslinkable monomers are used to prepare the polymer, n is any positive integer and m is zero. When uncrosslinkable monomers are included in the polymerization reaction, the ratio m/n can be from 0 to 10000 or more as desired. When only uncrosslinkable monomers are used to prepare the polymer, m is any positive integer and n is zero. When crosslinkable monomers are included in the polymerization reaction, n/m can be from 0 to 10000 or more. Preferably, when both crosslinkable monomers and uncrosslinkable monomers are present, they can be used in any molar ratio to achieve a desired amount of crosslinked polymer, for example, a molar ratio of 1:1000 to 1000:1, or more preferably 1:100 to 100:1, respectively. In a preferred embodiment, the ratio of crosslinkable monomer to uncrosslinkable monomer is from 1:10 to 10:1, for example as disclosed in Example 8.

Enhanced retention of polar compounds can be effected by using a polymeric monolith having capabilities of hydrophilic interactions (e.g., proton accepting, proton donating, dipolar, electrostatic attraction, ion exchange, etc.) as well as hydrophobic interactions. To provide enhanced adsorption of polar compounds, the polymer can be modified with a polar functionality to provide hydrophilic in addition to a hydrophobic interaction. In addition, enhanced adsorption of charged compounds can be effected by a polymer having ion exchange capabilities. To provide a polymer modified porous substrate having ion exchange capabilities, an ion exchange functionality can be introduced onto the polymer. Accordingly, the aryl or heteroaryl moieties can be functionalized with a polar functionality after the polymeric monolith is formed on the porous substrate, by optionally substituting the aryl or heteroaryl moieties with -L-$Q_p$-$R_q$; wherein q is 0-3; p is 0-5, or more preferably p is 0-2; Q is —NRC(O)—, —C(O)NR—, —OC(O)NR—, —OC(O)R—, —NRC(O)O—, —NRC(O)NR—, —NCO, —CHOHCHOH—, $CH_2OCHCH_2O$—, —($CH_2CH_2O$)$_s$—, —($CH_2CH_2CH_2O$)$_s$—, —C(O)—, —C(O)O—, —$CH_2$C(O)$CH_2$—, —S—, —SS—, —CHOH—, —O—, —SO—, —$SO_2$—, —$SO_3$—, —$OSO_3$, —$SO_2NMe$—, —$NR_q$—, and —$NR_q^+$— (where R is not H), —CN, —NC, —CHOCH—, —NHC(NH)NH—, —$NO_2$, —NO, —$OPO_3$—, —OH, where s is 1-12; and R is hydrogen, $C_{5-10}$ monocyclic or bicyclic aryl or heteroaryl, $C_{1-12}$ branched, unbranched, or cyclic hydrocarbyl. The polar functionalized modified porous substrate thus provided adsorbs analytes utilizing hydrophobic as well as hydrophilic interactions, which includes at least one interaction selected from proton accepting, proton donating, dipolar, electrostatic attraction and ion exchange interactions.

The polymer can also be formed from a crosslinkable monomer, such as divinylbenzene, which can provide additional structural strength to the polymer. The polymer can comprise, for example, poly(styrene divinylbenzene), copolymers of styrene or divinylbenzene with functionalized aryl or heteroaryl moieties such as styrenes or heterocycles carrying substituents such as halo or alkyl. Thus, a representative, but non-limiting, list of polymers that can be utilized as the polymer for modifying the porous substrate includes, but is not limited to, polystyrene, poly(styrene divinylbenzene), copolymers comprising styrene or divinylbenzene and halogenated or alkylated styrenes, pyridines, thiophenes, furans, imidazoles, and the like.

III. Porous Substrates

The porous substrates can be any porous solid structure providing sufficient solvent and analyte access and porosity (e.g., a density of no more than about 1 cc/g). Preferably, the porous substrate also exhibits substantial inertness so that the porous substrate does not dissolve or erode under the conditions of polymer formation or analyte isolation. Preferably, the porous substrate is in the form of a monolith, agglomerated particles, or woven or nonwoven fibers, preferably nonwoven fibers including macro and microfibrous webs such as melt-blown webs, spunbonded or air laid webs and blown fibrous webs, such as described in U.S. Pat. No. 5,328,758 and references cited therein. The porous substrate can be formed from inorganic materials such as metal or metalloid oxides (e.g., silica, alumina, titania, zirconia, vanadia, zeolite, mullite, glass, etc.), metals (e.g., stainless steel), or organic materials such as carbon fibers, cellulosic materials (e.g., nitrocellulose, cellulose acetate), synthetic polymers including poly(vinylchloride), polyacrylamide, polyacrylate, polyolefins (e.g., polyethylene, polypropylene, polytetrafluoroethylene (PTFE)), poly(4-methylbutene, polystyrene, polyurethanes, polyacrylonitriles, polymethacrylate, poly(ethylene terephthalate), polysiloxanes, nylon, poly(vinyl butyrate), and the like, or mixtures or composites of any of the above. The porous substrate does not itself adsorb a significant amount of analytes, due to the polymerization of monomers upon and throughout the porous substrate. Preferably, the porous substrate is a glass fiber monolith.

In certain embodiments, the porous substrate is inert. By "inert" is meant that the porous substrate underlying the polymer modified porous substrate is sufficiently stable under conditions of use (e.g., analyte isolation and preparation using solvents, acids, bases, salts or buffers, etc.) such that the polymer modified porous substrate can be used without contamination of the analyte solution. In particular embodiments, the porous substrate is sufficiently inert to be used to prepare an amide functionalized polymer modified porous substrate, for example, involving the use of strong acids or base, without losing structural integrity. Typical inert substrates include polymeric substrates such as polyolefins (e.g., polyethylene, PTFE), polysiloxanes, polystyrenes, and the like, inorganic substrates formed from materials such as silica, zirconia, vanadia and alumina, for example, in the form of glass or ceramic fibers, and the like, and metals (e.g., stainless steel mesh). Preferably, the substrate is a glass fiber monolith. There is no particular limitation on the type of glass fiber that can be used. For example, good results have been obtained with glass fibers having thickness of between about 0.010 and 0.050 inches. However, fibers of other thicknesses can be utilized.

The porous substrates can include ultraporous monolithic substrates formed, for example, as described in commonly owned, co-pending U.S. patent application Ser. No. 11/018168, filed on Dec. 20, 2004. Further inert porous substrates can be prepared by forming silica particles which can then be coalesced into a porous structure. One variation is described in U.S. Pat. No. 4,017,528 to Unger, which describes a process for preparing a hybrid silica wherein an alkyl functionality is coupled onto both the skeleton structure and the surface of the silica. The method involves forming a mixture of tetraethoxysilane (TEOS) and an organotriethoxysilane and hydrolyzing the silanes in the presence of an acid catalyst to form polyalkylethoxysiloxane oligomers that are then gelled into porous hybrid particles in the presence of a base catalyst.

Preferably, the porous substrate is in a form that is suitable for performing solid phase extraction of analytes. Applications are discussed further below.

IV. Porogenic Solvents

The polymer formed upon the porous substrate is itself porous. Porosity is provided by a porogenic solvent that exhibits the following properties: it dissolves in the monomer mixture, is inactive to the polymerization reaction and does not dissolve the polymer produced. Suitable porogenic solvents include, but are not limited to, aromatic hydrocarbons, such as toluene, xylene, ethylbenzene and diethylbenzene; saturated hydrocarbons, such as hexane, heptane, octane and decane; alcohols, such as isoamyl alcohol, octanol, decanol, dodecanol and 2-ethylhexyl alcohol; aliphatic halogenated hydrocarbons, such as dichloromethane, dichloroethane and trichloroethane; aliphatic or aromatic esters, such as ethyl acetate, butyl acetate, dimethyl phthalate and diethyl phthalate; and glycerol triesters, such as triacetin, tributyrin and tricaprin. The porogenic solvents can be used individually or in combination of two or more thereof. The amount of the porogenic solvent added can be varied from about 10% to 300% by mass based on the total amount of the monomers.

V. Polymerization Initiators

Polymerization initiators include radical polymerization initiators such as benzoyl peroxide, diisopropyl peroxydicarbonate, t-butyl peroxy-2-ethylhexanoate, t-butyl peroxypivalate, t-butyl peroxydiisobutyrate, lauroyl peroxide, dimethyl 2,2'-azobisisobutyrate (MAIB), azobisisobutyronitrile (AIBN) and azobiscyclohexanecarbonitrile (CAN).

VI. Polar Functionalization of the Polymer Modified Substrate

In certain preferred embodiments, the aryl or heteroaryl moieties of the polymeric monolith formed on the porous substrate can be functionalized with a polar functionality after the polymeric monolith is formed on the porous substrate, by treating the polymer so as to introduce polar functionalities such as -L-$Q_p$-$R_q$; wherein q is 0-3; p is 0-5, or more preferably p is 0-2; Q is —NRC(O)—, —C(O)NR—, —OC(O)NR—, —OC(O)R—, —NRC(O)O—, —NRC(O)NR—, —NCO, —CHOHCHOH—, $CH_2OCHCH_2O$—, —$(CH_2CH_2O)_s$—, —$(CH_2CH_2CH_2O)_s$—, —C(O)—, —C(O)O—, —$CH_2C(O)CH_2$—, —S—, —SS—, —CHOH—, —O—, —SO—, —$SO_2$—, —$SO_3$—, —$OSO_3$, —$SO_2NR$—, —$NR_q$— and —$NR_q^+$—, —CN (nitrile), —NC, —CHOCH—, —NHC(NH)NH—, —$NO_2$, —NO, —$OPO_3$—, —OH, where s is greater than 1, or more preferably 1-12; and R is hydrogen, $C_{5-10}$ monocyclic or bicyclic aryl or heteroaryl, $C_{1-12}$ branched, unbranched, or cyclic hydrocarbyl. The polar functionalized modified porous substrate thus provided adsorbs analytes utilizing hydrophobic as well as hydrophilic interactions, which includes at least one interaction selected from proton accepting, proton donating, dipolar, electrostatic attraction and ion exchange interactions.

In preferred embodiments, the polar functionality is an amide, amine, or nitro. In another preferred embodiment, the polar functionality is a cation exchange functionality (e.g., sulfonic acid). In an additional preferred embodiment, the polar functionality is an anion exchange functionality (e.g., quaternary amino).

VII. Devices

In an additional aspect, there are provided devices for performing solid phase extraction. For example, the polymer modified porous substrate can be further associated with a support or supporting format. A list of representative supports and supporting formats includes, but is not limited to, syringe barrel cartridges, chromatography columns, additional polymeric or glass fiber membranes, microfluidics platform, pipette tips and multiwelled plates, although disks and other supports can also be employed. The polymer modified porous substrate can be disposed on the surface of a supporting format, for example on the surface of a multiwelled plate, or the polymer modified porous substrate can be embedded in a supporting format, for example between polymeric or glass fiber membranes. Thus, by "association" it is generally meant that a sorbent can be in contact with a support or supporting format.

In another aspect, the polymer modified porous substrate can be associated with a support to facilitate analyte loading and/or elution with solvent. A support or a supporting format can have any one of a number of configurations or shapes, such as strip, plate, disk, hollow tube, rod, and the like. A support or supporting format can be hydrophobic, hydrophilic or capable of being rendered hydrophilic. Representative supports and supporting formats include, without limitation, syringe barrel cartridges, pipette tips, multiwelled plates, microfluidics platforms, integrated sample preparation, injection and detection device, and the like, and can be disposed on a surface of the supporting device or embedded within a channel or tube within the device.

In a preferred embodiment, the polymer modified porous substrate is used in solid phase extraction devices such as a solid phase extraction pipette, for example, as described in co-pending U.S. Patent Application Ser. No. 60/473996 filed on May 29, 2003 and PCT Application No. US2004/016904 filed on May 28, 2004 to Hudson, which is directed to the preparation and use of solid phase extraction devices comprising a functionalized monolithic sorbent comprising a glass fiber matrix embedded with a bonded phase comprising a metal oxide or metalloid oxide having reactive metal oxides capable of reacting with silanes. The solid phase extraction pipette typically comprises a hollow tube having one broader opening and one narrower opening that functions as a pipette tip. One method to prepare the solid phase extraction pipette generally comprises placing the polymer modified porous substrate in the smaller opening of the pipette by the following steps: inserting the polymer modified porous substrate into the larger opening of the pipette; applying reduced pressure to the smaller opening of the pipette to insert the polymer modified porous substrate; applying positive pressure to the larger opening of the pipette to insert the polymer modified porous substrate into the pipette tip; and compacting the polymer modified porous substrate. In additional methods for preparing solid phase extraction pipettes, hydrophobic monomers can be polymerized on the porous substrate after its insertion into the pipette. In certain preferred embodiments, the polymer modified porous substrate can be polar functionalized prior to or after insertion into the pipette.

In an additional embodiment, the polymer modified porous substrate can be used in the form of a disk and incorporated into a solid phase extraction plate utilizing one or a plurality of solid phase extraction disks press fitted between the sidewalls of the chambers, as described in U.S. Pat. No. 5,906,796 to Blevins.

In an additional embodiment, the polymer modified porous substrate is used in a solid phase extraction cartridge or multi-welled plate. Examples of such cartridges (e.g., syringe barrel cartridges) and multi-well plates are described in, for example, U.S. Pat. No. 6,200,533.

VIII. Methods of Preparing Polymer Modified Porous Substrates

The polymer modified porous substrate is formed on the porous substrate utilizing the free radical reaction of hydrophobic monomers comprising polymerizable olefin moieties, such as vinyl, allyl, propenyl, butenyl, and the like. The method for preparing a polymer modified porous substrate generally comprises (a) contacting a porous substrate with a solution comprising one or more hydrophobic monomers, a porogenic solvent and a polymerization initiator; and (b) heating the porous substrate and retained solution in the absence of oxygen to polymerize the one or more monomers onto the porous substrate. The method can further comprise (c) removing excess solution from the porous substrate prior to heating. In a preferred embodiment, the porous substrate is a glass fiber monolith, and the polymeric monolith formed thereon is formed from hydrophobic monomers that comprise a mixture of crosslinkable and uncrosslinkable monomers in a molar ratio of 1:1000 to 1000:1, or more preferably 1:100 to 100:1, respectively. However, there is no particular limit to the amount of crosslinkable monomer or uncrosslinkable monomer that can be used, and in principle 100% of either can be utilized with good results.

The hydrophobic monomers preferably comprise aryl moieties including $C_{5-10}$ monocyclic or bicyclic aryl or heteroaryl groups, optionally substituted with nonpolar substituents including $C_{1-12}$ branched or unbranched hydrocarbyl, halo, for example. Preferably, the hydrophobic monomer has the formula

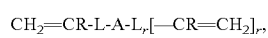

where L is a bond or a $C_{1-12}$ branched, unbranched, or cyclic hydrocarbyl; A is a $C_{5-10}$ monocyclic or bicyclic aryl or heteroaryl, optionally substituted with $C_{1-2}$ branched or unbranched hydrocarbyl, or halo; and r is 0 or 1. Typical aryl moieties include benzene, toluene, xylene, and naphthalene, though heteroaryl moieties such as thiophene, thiazole, furan, imidazole, benzimidazole, benzofuran, pyridine, pyrimidine, pyrazole, pyrrole, pyrazine, purine, and the like that provide more hydrophilic character can also be utilized. In particular embodiments, the aryl moiety can comprise a bicyclic ring wherein one ring is aryl while the other is not aryl, or multiple rings such as fluorene.

Typical monomers are mono- or di-substituted with vinyl, methylvinyl, ethylvinyl, allyl, propenyl, butenyl, etc. Monomers having only one polymerizable olefin group are uncrosslinkable, and typically include vinyl or allyl substituted $C_{5-10}$ monocyclic or bicyclic aryl or heteroaryl, optionally substituted with $C_{1-12}$ branched or unbranched hydrocarbyl, or halo, or combinations thereof. Particular examples of uncrosslinkable monomers include styrene, vinylpyridines (e.g., 2-vinylpyridine, 3-vinylpyridine, 4-vinylpyridine), vinylnaphthalene, vinylxylene, allyltoluene, vinylthiophene, vinylthiazole, allylfuran, allylimidazole, vinylbenzimidazole, vinylpyrazole, allylpyrrole, vinylpyrazine, or combinations thereof.

Monomers having at least two polymerizable olefin groups are crosslinkable, and typically include divinyl or diallyl substituted $C_{5-10}$ monocyclic or bicyclic aryl or heteroaryl, optionally substituted with $C_{1-12}$ branched or unbranched hydrocarbyl, or halo, or combinations thereof. Particular crosslinkable monomers include divinylbenzene, divinyltoluene, divinylxylene, diallylnaphthalene, divinylpyridine (e.g., 2,4-divinylpyridine), diallylthiophene, divinylthiazole, divinylfuran, diallylimidazole, divinylbenzimidazole, diallylpyridine, divinylpyrazole, diallylpyrrole, divinylpyrazine, or combinations thereof.

Once formed on the porous substrate, the polymer can be functionalized with a polar functionality in order to vary the adsorption characteristics of the polymer. Accordingly, the aryl or heteroaryl moieties, can be functionalized with a polar functionality after the polymeric monolith is formed on the porous substrate, by treating the aryl or heteroaryl moieties to introduce a polar substituent -L-$Q_p$-$R_q$; wherein Q is —NRC(O)—, —C(O)NR—, —OC(O)NR—, —OC(O)R—, —NRC(Q)O—, —NRC(O)NR—, —NCO, —CHOHCHOH—, $CH_2OCHCH_2O$—, —$(CH_2CH_2O)_s$—, —$(CH_2CH_2CH_2O)_s$—, —C(O)—, —C(O)O—, —$CH_2C$(O)$CH_2$—, —S—, —SS—, —CHOH—, —O—, —SO—, —$SO_2$—, —$SO_3$—, —$OSO_3$, —$SO_2NMe$—, —$NR_q$—, and —$NR_q^+$—, —CN(nitrile), —NC, —CHOCH—, —NHC (NH)NH—, —NO$_2$, —NO, —OPO$_3$—, —OH, where s is greater than 1, or more preferably 1-12; and R is hydrogen, C$_{5-10}$ monocyclic or bicyclic aryl or heteroaryl, C$_{1-12}$ branched, unbranched, or cyclic hydrocarbyl; and wherein q is 0-3; p is 0-5, or more preferably p is 0-2; and L is a bond or a C$_{1-12}$ branched, unbranched, or cyclic hydrocarbyl. In preferred embodiments, the polar functionality that is introduced is amide, nitro, carbamide, urethane, carbamyl, carbamate, carboxyl or hydroxyl, and can also include ion exchange functionalities such as amine and sulfonate, or mixtures of any of the polar functionalities.

An exemplary method for aminating the polymer modified porous substrate is described in Example 2. Briefly, the method involves nitrating the polymer modified porous substrate to form the nitrated polymer modified porous substrate; reducing the nitrated polymer modified porous substrate to form the aminated polymer modified porous substrate; and acylating the aminated polymer modified porous substrate with an acid, an acid chloride or an acid anhydride to form the amidated polymer modified porous substrate. Generally, the nitrating comprises: (a) contacting the polymer modified porous substrate with a first solution comprising nitric acid; and (b) contacting the polymer modified porous substrate with a second solution comprising a reagent adapted to generate a nitronium ion to the first solution. In a preferred method, the procedure involves treating the polymer modified porous substrate with concentrated nitric acid (about 30 molar equivalents) with stirring. While cooling the mixture in cold water, concentrated sulfuric acid (18 molar equivalents) is added dropwise over a period of 1 to 1.5 hours, continuing the stirring. The nitrated polymer modified porous substrate can then be removed and washed with water, 2.0M NaOH, water and acetone, and dried.

The nitrated polymer modified porous substrate is then subjected to a reduction step, wherein the reducing comprises: contacting the nitrated polymer modified porous substrate with a first solution comprising a first acid; and contacting the nitrated polymer modified porous substrate with a second solution comprising a metal catalyst and a second acid. Preferably, the first acid is an organic acid, and the second acid is selected from hydrochloric acid, an organic acid or combinations thereof. Preferably, the metal catalyst is selected from stannous chloride, zinc metal, an organo-metallic hydride, or hydrogen in the presence of a metal. In a preferred method, the procedure involves: suspending and stirring the nitrated polymer modified porous substrate in glacial acetic acid at room temperature, while treating with a solution of stannous chloride in 1:1 hydrochloric acid. The aminated polymer modified porous substrate is removed from the reaction and washed with water, and 1.0 M sodium hydroxide until all traces of tin are washed out. Then the aminated polymer modified porous substrate is washed with water until the wash water pH is neutral, and then is washed with acetone, and dried.

The aminated polymer modified porous substrate can then be further modified with an additional moiety if desired, such as hydrocarbyl, aryl or heteroaryl, for example, using alkylating agents such as iodomethane, iodoethane, iodotoluene, or iodofuran to prepare secondary, tertiary or quaternary amines. Alternatively, the amine functionalized polymer modified porous substrate can be further treated to result in an amide polar functionality by acylating the aminated polymer with a suitable reactant, such as an acid, acid chloride or anhydride. Typically, the acylating comprises: suspending the reduced polymer modified porous substrate in a first solution comprising a base to form a basic reaction solution; and adding an acid, an acid chloride or an anhydride to the basic reaction solution. Preferably, the base is selected from triethylamine, pyridine, alkyl pyridines, quinoline, alkylquinolines, trialkylamines, imidazole or triazole. Preferably, the acid chloride is selected from acetyl chloride, alkanoyl chlorides, aryl chlorides and heteroaryl chlorides; the anhydride is selected from acetic anhydride, anhydrides of aliphatic acids (C$_{2-12}$), anhydrides of aromatic acids, anhydrides of heterocyclic acids; and the acid is selected from aliphatic acids, aromatic acids, or heterocyclic carboxylic acids. Mixtures of any of these acylating agents can also be utilized.

An exemplary method for introducing an amide moiety is described in Example 2. The aminated polymer modified porous substrate is suspended in excess base (e.g., triethylamine or pyridine), and with stirring, is treated dropwise with the acid, acid chloride or anhydride (1.5 mole equivalent to mole of nitrogen of the aminated polymer), at room temperature. The amide functionalized polymer modified porous substrate is removed from the reaction mixture and washed several times with 0.1M hydrochloric acid and then with deionized water, methanol and acetone. Finally, the amide functionalized polymer modified porous substrate is dried. Preferably, the amide functionalized polymer modified porous substrate comprises between about 0.1% and about 10.0% nitrogen by mass percent, or more typically, between about 0.4% and about 5.0% nitrogen. The polar functionalized polymer modified porous substrate remains solvated after contact with water and an organic solvent for longer than about one hour.

The polymer modified porous substrates can also be functionalized with ion exchange functionalities to provide ion exchange capabilities. A preferred cation exchange functionality is sulfonate, which can be introduced onto the polymer modified porous substrate by sulfonation. An exemplary method for sulfonating the polymer is described in U.S. Pat. No. 6,322,695 to Lee. Briefly, a sulfonated polymer modified porous substrate (e.g., poly(styrenedivinylbenzene) or poly(divinylbenzene-co-N-vinylpyrrolidone) copolymer modified glass fiber) can be prepared by derivatization with sulfuric acid as follows: Sulfuric acid and the polymer modified porous substrate is introduced into a flask fitted with a thermometer, agitator, condenser and reactor temperature control system to a weight ratio of about 5 to 100 H$_2$SO$_4$ (95-98%) to polymer, and reacted at a chosen temperature and agitation adjusted to ensure adequate mixing. The reaction mixture is stirred for a certain period of time at constant temperature, and then the polymer modified porous substrate is washed with water, and then dried. The level of sulfonation can be determined by sulfur elemental analysis (e.g., Atlantic Microlab Inc., Norcross, Ga.). The reaction temperature and reaction time can be chosen to prepare polymers with desired ion exchange capacities.

A preferred anion exchange functionality is quaternary amino, which can be introduced onto the polymer modified porous substrate by amination and alkylation, as mentioned above. Briefly, the procedure described by Corradini, C. et al. (1994) *J. Chromatography A* Vol. 685, pp. 213-220 can be utilized as follows: the polymeric monolith formed on the porous substrate can be nitrated by adding the polymer modified porous substrate to a cold solution of 75% (v/v) fuming nitric acid and sulfuric acid and stirred for 3 hours, and then heated to 60° C. for 6 hours. The nitrated polymer modified porous substrate can be washed with water, sodium hydroxide, water and solvent and dried. The nitrated polymer modified porous substrate is then reduced in dimethylformamide using granulated tin metal and hydrochloric acid at 5° C. followed by heating to 25° C. for 2 hours, followed by heating to 90° C. and maintaining this temperature overnight. The aminated polymer modified porous substrate can then be washed with water, sodium hydroxide, water and solvent and dried. Finally, the aminated polymer modified porous substrate can be quaternized by methylation using iodomethane (excess) and heating to 60° C. for 10 hours. After reaction, the polar functionalized polymer modified porous substrate can be washed with water, solvents, triethylamine, solvents and dried.

One skilled in the art will readily envision additional methods for introducing polar functionalities that can be provided on the polymer modified porous substrate. For example, nitrile functionalized polymer modified porous substrates can be provided by reaction of benezenesulfonic acid moieties (produced as described above) with KCN, or by dehydration of amide functionalized polymer modified porous substrates. Hydroxyl functionalized polymer modified porous substrates can be provided by reaction of benzenesulfonic acid moieties (produced as described above) with caustic alkali (NaOH, KOH). Carboxy functionalized polymer modified porous substrates can be provided by reaction of a polymer modified porous substrate comprising alkyl substituted aryl or heteroaryl (e.g., toluene) with $KMnO_4$. Carbamide functionalized polymer modified porous substrates can be provided by reaction of aminated polymer with ClC(O)NR. Carbamyl functionalized polymer modified porous substrates can be provided by reaction of carboxy functionalized polymer with $NR_3$, where R is hydrogen, hydrocarbyl, aryl or heteroaryl. Alkyloxy functionalized polymer modified porous substrates can be provided by reaction of hydroxyl functionalized polymer with an acid, acid chloride or anhydride (e.g., acetoxy can be prepared from $ClC(O)CH_3$). Carbamate functionalized polymer modified porous substrates can be provided by reaction of aminated polymer with chloroformates. Urethane functionalized polymer modified porous substrates can be provided by reaction of hydroxyl functionalized polymer with an isocyanate. Isocyanate functionalized polymer modified porous substrates can be provided by reaction of aminated polymer with phosgene, for example. Isonitrile functionalized polymer modified porous substrates can be provided by reaction of aminated polymer with chloroform.

One skilled in the art will recognize that the amount of polar functionality can be controlled and chosen to provide the desired adsorption of analytes. For example, as discussed in Example 3, the $PSDVB-NHCOCH_3$ modified porous substrate contains 2.55% nitrogen, but lesser or greater amounts of polar functionality could be utilized to provide a $PSDVB-NHCOCH_3$ having lesser or greater amounts of nitrogen to provide desired adsorption characteristics. Accordingly, the present methods for preparing polar functionalized polymer modified porous substrates also provide methods for controlling the adsorption of analytes having a particular polarity, and for tailoring the polymer modified porous substrate to achieve that goal.

In an additional embodiment, polar FUNCTIONALIZED polymer modified porous substrates can be prepared comprising mixtures of polar functional groups. In this embodiment, the polymer modified porous substrates can provide both superior retention of polar analytes, superior wettability, and specific adsorption capabilities, such as ion exchange functionality. In preferred embodiments, the mixtures of polar functional groups include amide+amine, amide+sulfonic acid, nitrile+sulfonic acid, and amide+quaternary amine. However, any of the polar groups can be used as mixtures.

IX. Methods for Separating Analytes

The polymer modified porous substrates can be utilized in methods of separating compounds for analysis, such as chromatography. Suitable chromatographic applications or separation methods include, for example, thin layer chromatography, high performance liquid chromatography, reversed phase chromatography, normal phase chromatography, ion chromatography, ion pair chromatography, reverse phase ion pair chromatography, ion exchange chromatography, affinity chromatography, hydrophobic interaction chromatography, size exclusion chromatography, chiral recognition chromatography, perfusion chromatography, electrochromatography, partition chromatography, microcolumn liquid chromatography, capillary chromatography, liquid-solid chromatography, preparative chromatography, hydrophilic interaction chromatography, supercritical fluid chromatography, precipitation liquid chromatography, bonded phase chromatography, fast liquid chromatography, flash chromatography, liquid chromatography-mass spectrometry, gas chromatography, microfluidics based separations, solid phase extraction separations, or monolith based separations, without limitation. A preferred chromatographic application for the polymer modified porous substrates is solid phase extraction, for example, performed using a SPE cartridge, or ion exchange chromatography.

The miniaturization of liquid separation techniques to the nano-scale involves small column internal diameters (<100 micron i.d.) and low mobile phase flow rates (<300 nL/min). Techniques such as capillary chromatography, capillary zone electrophoresis (CZE), nano-LC, open tubular liquid chromatography (OTLC), and capillary electrochromatography (CEC) offer numerous advantages over conventional scale high performance liquid chromatography (HPLC). These advantages include higher separation efficiencies, high-speed separations, analysis of low volume samples, and the coupling of 2-dimensional techniques.

A method for performing a chromatographic separation of analytes can generally comprise a) providing a polymer modified porous substrate disposed in a chromatography apparatus (e.g., column, cartridge, channels on a microchip, etc.); b) conditioning said polymer modified porous substrate with one or more mobile phases (e.g., an organic solvent, aqueous solution of optional buffers or salts, or mixtures thereof, such as acetonitrile/formic acid/water, or gradients of solvent mixtures); c) contacting said polymer modified porous substrate with a solution comprising one or more analytes (e.g., plasma, environmental water sample, mixtures of synthetic reactants, products and intermediates, etc.); d) passing a mobile phase comprising an organic solvent, an aqueous solution, or mixtures thereof, through said polymer modified porous substrate; and e) eluting one or more analytes from the polymer modified porous substrate (e.g., using an appropriate mobile phase comprising counterions, organic solvents, etc.). As the polymer is formed directly on the porous substrate, channeling and shrinkage of the sorbent (the polymer modified porous substrate) within the chromatography apparatus can be minimized when using a nonswellable porous substrate such as a glass fiber monolith.

X. Methods for Performing Solid Phase Extraction

In a particular aspect, a method for isolating an analyte from a sample using solid phase extraction is disclosed. Representative procedures for performing solid phase extraction are described in Examples 4-6. The sample can be derived from any source, although the polymer modified porous substrate and methods described herein are particularly suited for isolating an analyte from biological, environmental, synthetic and pharmaceutical samples, and the like. For example, a sample can comprise a biological matrix (e.g., whole blood or plasma or saliva or urine, etc.) comprising an analyte of interest (e.g., a drug, peptide or hormone, etc.). Alternatively, a sample can comprise an environmental sample, such as an extract of soil or, or a drinking water sample or water known or suspected of being polluted (e.g., effluent water). In another example, the sample can comprise an analyte that is a therapeutically-active agent or precursor or metabolite thereof.

The method for isolating an analyte generally comprises four steps: (a) conditioning a polymer modified porous substrate with an organic solvent and optionally an aqueous solvent, or mixtures thereof, (b) adsorbing analytes present in a sample to be analyzed to the conditioned polymer modified porous substrate; and (c) eluting the adsorbed analytes from the polymer modified porous substrate with an organic solvent, an aqueous solvent, or mixtures thereof. The method can further comprise washing the polymer modified porous substrate and adsorbed analytes prior to performing step (c), and can further comprise analyzing the analyte using any suitable analytical methodology or instrumentation.

The conditioning step generally comprises treating the polymer modified porous substrate with solvents that enhance surface characteristics. In a preferred embodiment, the method comprises conditioning the polymer modified porous substrate by washing the polymer modified porous substrate with an organic conditioning solvent (e.g., methanol) followed by water, for example about 1 mL each. The polymer modified porous substrate can be associated with a support, such as a cartridge or column, in which case, the step of conditioning can comprise passing an organic solvent over the cartridge or column, followed by passing an aqueous solvent over the cartridge or column. The methanol swells the polymer modified porous substrate and enhances the effective surface area. The water treatment removes excess methanol and hydrates the polymer surface. The conditioned surface can then be subjected to vacuum to remove excess solvents; the polymer modified porous substrate remains completely hydrated after this treatment. A sample comprising an analyte can then be contacted with the polymer modified porous substrate to form a polymer modified porous substrate-analyte complex. This step, sometimes referred to as sample loading, allows adsorption of one or more analytes, if present, on the polymer modified porous substrate. The adsorption of analytes, and hence their retention, is a function of the hydrophobic as well as hydrophilic (e.g., dipolar, proton accepting, proton donating, electrostatic attraction, etc.) interactions of analytes with the polymeric sorbent formed on the porous substrate. Thus, a polymer modified porous substrate that facilitates hydrophobic as well as hydrophilic interactions with analytes will retain analytes of varying polarities and chemical characteristics. Desorption and recovery of the analytes can then be performed using a solvent that is capable of disrupting the hydrophobic and hydrophilic interactions of the polymeric sorbent with the analytes.

Accordingly, in a preferred embodiment, the polymer modified porous substrate is used in a solid phase extraction format and comprises a polymer modified porous substrate that has been polar functionalized. Exemplary polymeric monoliths formed on the porous substrate include poly (styrene-divinylbenzene), copolymers formed from styrene, allyl benzene, divinyl or diallylbenzene, hydrocarbyl or halo substituted styrenes, vinylfurans, vinylpyridines, etc. and combinations thereof, and is polar functionalized with amide, which provides a very favorable retention of polar analytes and a linear correlation of retention with analyte polarity. In additional preferred embodiments, the polymer modified porous substrate is functionalized with other polar groups such as amino, quaternary amino, nitro, sulfonic acid, and the like.

When a sample comprises blood plasma, the sample can be introduced as diluted aqueous solutions (at least 1:1 dilution). This practice can be desirable because of the high viscosity of plasma samples from animals or humans, which prevents free flow unless diluted to reduce viscosity. However, due to the excellent flow properties of the polymer modified porous substrates, sample viscosity is less problematic than with conventional sorbents used for solid phase extraction. It is usually preferable to avoid the use of organic solvents in this step, since these solvents can precipitate proteins from the plasma solution and the precipitated proteins can foul the sorbent surface. Again, the excellent flow properties of the polymer modified porous substrates obviate some of this difficulty. It can also be desirable that a sample is contacted with the polymer modified porous substrate under conditions conducive to adsorption of the analyte and the polymer. At the same time, these conditions are preferably unfavorable for retaining unwanted proteins and other impurities on the sorbent surface. Such conditions can include conducting the contacting at about room temperature and neutral pH.

In a one embodiment, a sample is loaded in a 1:1 aqueous solution and an analyte (e.g. a drug) can be present in one nanogram to 10 microgram per milliliter levels. A sample volume of about 100 to about 1000 microliters can be loaded, although volumes of about 400 to about 500 microliters are preferred. The polymer modified porous substrate-sample complex can then be washed with water, followed by an organic wash solvent. In one embodiment, the sample loaded sorbent is washed with water and then with about 10 to about 30% acetonitrile in water (any volume can be employed, although volumes from about 200 to about 1000 microliters are preferred). The water wash removes salts and other water-soluble matrix constituents that might be present in a sample, in addition to proteinaceous matter. The binary aqueous-organic wash can also remove organic impurities including water-insoluble matrix components that can adhere to the sorbent surface. It can be desirable to configure this wash so as not to disrupt the binding of an analyte to the polymeric sorbent surface. When many known silica based and polymeric sorbents are employed in a separation, such a binary wash can remove many polar analytes from the sorbent.

Next, an analyte can be eluted from the polymer modified porous substrate-analyte complex with an eluting solvent. The elution can be performed by passing a volume of an eluting solvent over the polymer modified porous substrate having adsorbed analytes. Representative eluting solvents include binary solvents comprising an aqueous component and an organic component. Preferably, the organic component comprises at least about 80-90% of the solvent. Representative organic components include, but are not limited to, acetonitrile and methanol. A trailing ion, such as trifluoroacetic acid, can also be employed as a component of an elution solvent and serves to disrupt the polar interactions of polar drugs with the sorbent effectively. In one embodiment, a 60:30:10 methanol/acetonitrile/0.1% trifluoroacetic acid is found to afford 90% to almost quantitative recoveries of drugs of a wide range of polarities (see FIG. 6). Eluting solvent volumes of about 400 microliters to about 1000 microliters can be employed, and volumes about 400 to about 500 microliters are preferred in some situations.

The eluent can be collected and the identity the recovered analytes ascertained, for example by mass spectrometry, liquid chromatography, gas chromatography or a combination of these and other techniques known to those of ordinary skill in the art. When an analyte of interest (e.g. a drug) is present in picogram levels in plasma, the eluting solvent can be evaporated and the residual analyte redissolved (i.e. reconstituted) in about 40 to about 100 microliters of the mobile phase used for LC or LC/MS.

An advantage of the polymeric sorbents and associated methods of the present invention is the ability to pass eluent directly to an instrument(s) for analyte identification. The direct passage to analytical instrumentation is not possible with many prior art sorbents, due, in part, to ion suppression effects of prior art sorbents and the inability of these sorbents to retain moderately polar to highly polar analytes. These deficiencies can lead to unwanted components in an eluent, which can significantly complicate analyte identification operations, and poor MS spectra. For example, a sorbent of the present invention can form a component of a system comprising the sorbent and a LC/MS/MS system. Samples can be loaded onto the sorbent, analytes eluted and the eluent stream fed directly into an LC/MS/MS system, HPLC system or any of a range of analytical instruments.

XI. Advantages of the Polymer Modified Porous Substrates

The polymer modified porous substrates described herein demonstrate superior flow rates, as demonstrated in Example 7, providing for faster sample preparation times and increased efficiencies in sample preparation. The polymer modified porous substrates exhibit flow rates of at least 40 mL/min, between about 40 mL/min to about 1 L/min, and more typically at least 100 mL/min, when tested using a solvent comprising 5% methanol in water through a disk having a diameter of about 47 mm. The superior flow characteristics result in reduced or eliminated channeling effects, as well as decreased clogging of the porous substrates during extraction of analytes, providing for greater consistency in analyte recovery and additional savings in time and expenses.

The polymer modified porous substrates described herein provide improved analyte recoveries, and recovery efficiencies. The substrates described herein are especially advantageous when polar functionalized and used with samples containing polar analytes, which can be challenging to recover for analysis. In addition, the substrates described herein can be used in high throughput applications, providing for high productivities.

Further, analytes can be eluted from the sorbents using small elution volumes, providing for more highly concentrated samples for analysis, decreased solvent volumes, elimination of a solvent evaporation step, and subsequent time savings. These features provide for savings in time and labor as well as materials.

The polymer modified porous substrates described herein provide varying retention of analytes having varying polarities, which provides advantages in isolating analytes of desired polarities. The polar functionalized polymer modified porous substrates provided herein exhibit improved retention of polar analytes, and superior retention of polar analytes relative to a polymeric monolith that is not polar functionalized. The polar functionalized polymer modified porous substrates also provide superior adsorption capacity for polar analytes. The polymer modified porous substrates provide a linear correlation between analyte retention and log P across a range of log P values, and the polar functionalized polymer modified porous substrates provide a linear correlation for across a broader range of log P values. In certain embodiments, the improved retention of polar analytes can be provided without the use of an ion exchange functionality.

As shown in Example 5, retention of each analyte by the polymer modified porous substrate, PSDVB modified glass fiber, was linear across a range of log P values from about 2.5 to 5. However, below log P values of 2.5, the retention was reduced, with relative retention of less than 80% for analytes having log P values of about 1.75, and less than 60% for analytes having log P values of about 1.6. Thus retention of relatively nonpolar analytes (e.g., analytes having log P values of greater than 2.5) by PSDVB modified porous substrates is preferred The relative retention of analytes by the polar functionalized polymer modified porous substrate, PSDVB-NH-COCH$_3$ modified glass fiber, was linear across the range of log P values tested, from about 1.6 to 5, with relative retention of most analytes being within 90% of the retention of nortriptyline. Thus retention of analytes is less dependent on analyte polarity with the polar functionalized polymer modified porous substrate.

Figure 4:
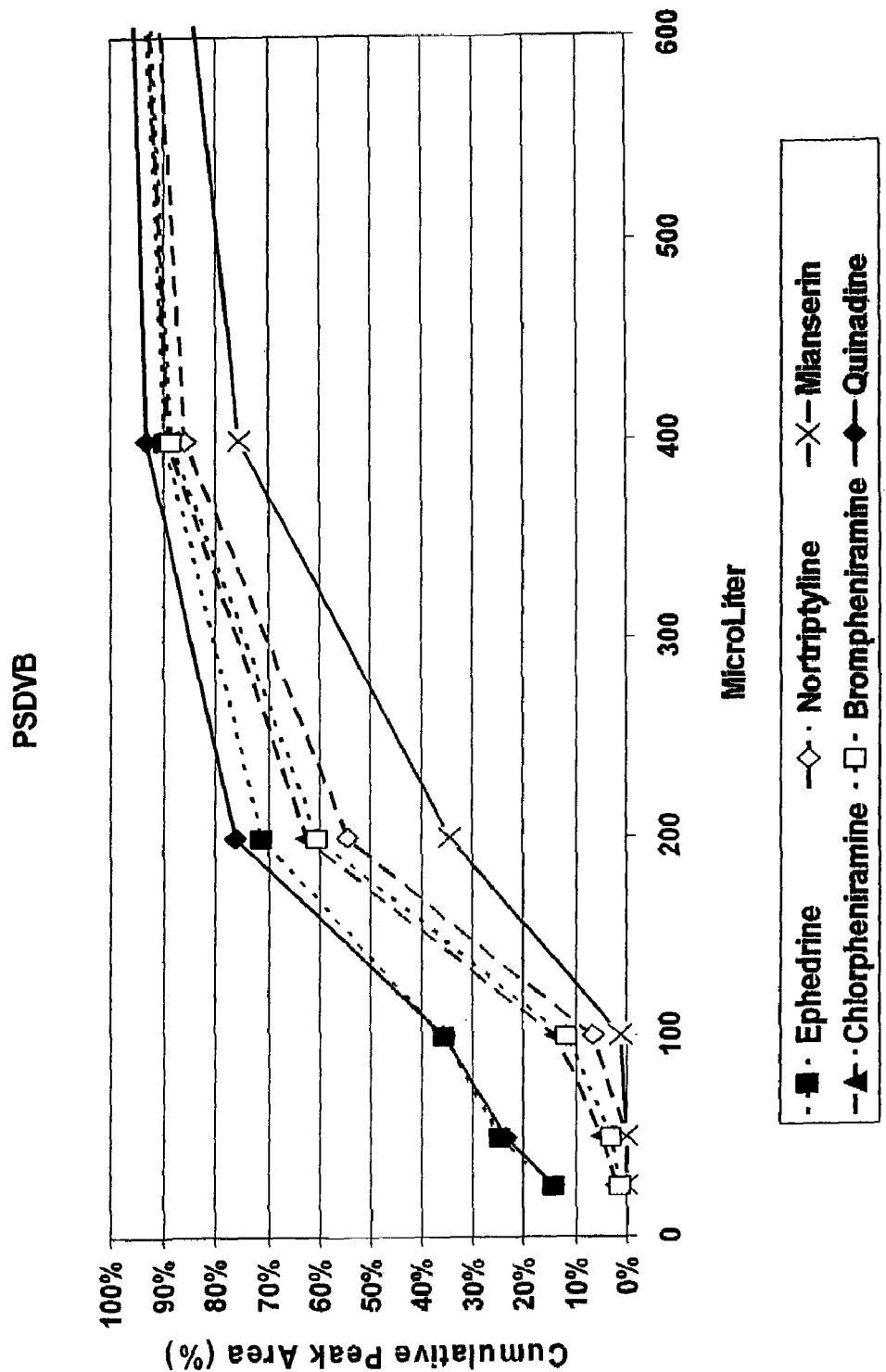
FIG. 4 illustrates the elution of analytes from one polymer modified porous substrate.

Use of the polymer modified porous substrates allows recovery of adsorbed analytes across a wide range of log P values in a small volume of elution solvent, minimizing the need to concentrate samples for further analysis. The elution of analytes from the PSDVB modified glass fiber indicates that the polymer modified porous substrate adsorbs analytes across a wide range of polarities, with similar recoveries observed for polar compounds (ephedrine) and nonpolar compounds (quinidine) (FIG. 4). Other analytes are retained longer, but could be eluted with similar solvent volumes. Thus, for certain analytes, recovery varies with solvent volume, showing some separation effect with recoveries of 75% to 95% of adsorbed analytes recovered after eluting with 400 μL or more of eluting solvent.

Figure 5:
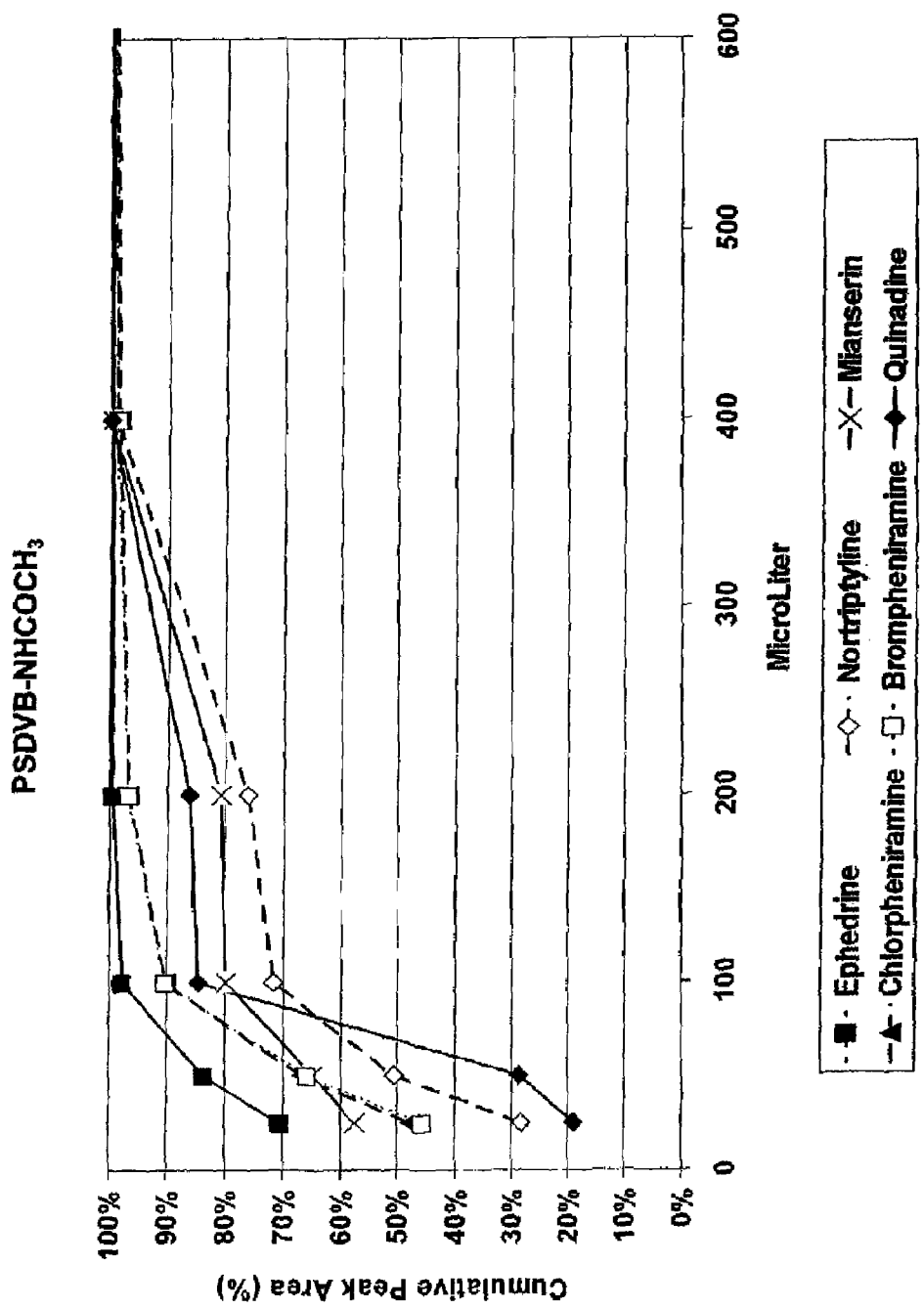
FIG. 5 illustrates the elution of analytes from a second polymer modified porous substrate.

As shown in FIG. 5, the elution of analytes from PSDVB-NHCOCH$_3$ modified glass fiber demonstrated very good recoveries of analytes having a wide variety of polarities using low volumes of eluting solvent. Greater than 95% recoveries were observed for all analytes with 400 μL of eluting solvent.

The capacity of the polymer modified porous substrates for analytes is high, and can be selected to retain analytes of a desired polarity. The nonpolar polymer surfaces retain nonpolar analytes preferentially, but when polar functionalized, also retain polar analytes as well. As shown in Example 6, the capacity of PSDVB-NHCOCH$_3$ modified porous substrates for polar analytes was generally about 1-2 μg retained. Where greater capacity is desired, additional polymer modified porous substrate can be utilized, for example, by employing a greater volume of polymer modified porous substrate, or adding additional devices. In a preferred embodiment, the polymer modified porous substrate is in the form of a glass fiber disk, and additional disks can be stacked to provide a greater analyte adsorption capacity.

In addition, the methods of preparing the polar functionalized polymer modified porous substrates described herein are efficient and simple, providing savings in cost and labor in the manufacturing process. The polar functionalized polymer modified porous substrates described herein are also efficient and simple to use, due to the high retention of analytes of varying polarities as well as the fast solvent flow rates, providing savings in time and solvent requirements for analysis of analytes.

It is to be understood that while the invention has been described in conjunction with the preferred specific embodiments thereof, that the description above as well as the examples that follow are intended to illustrate and not limit the scope of the invention. The practice of the present invention will employ, unless otherwise indicated, conventional techniques of organic chemistry, polymer chemistry, biochemistry and the like, which are within the skill of the art. Other aspects, advantages and modifications within the scope of the invention will be apparent to those skilled in the art to which the invention pertains. Such techniques are explained fully in the literature.

In the following examples, efforts have been made to ensure accuracy with respect to numbers used (e.g., amounts, temperature, etc.) but some experimental error and deviation should be accounted for. Unless indicated otherwise, temperature is in ° C. and pressure is at or near atmospheric. All solvents were purchased as HPLC grade, and all reactions were routinely conducted under an inert atmosphere of argon unless otherwise indicated. Unless otherwise indicated, the reagents used were obtained from the following sources: dodecanol, THF, styrene, DVB, AIBN, and decanol were obtained from Sigma Aldrich.

Abbreviations:
DVB divinylbenzene
AIBN azobisisobutyronitrile
THF tetrahydrofuran
ST styrene

EXAMPLE 1

Preparation of a Polymer Modified Porous Substrate

A PSDVB modified glass fiber monolith was prepared by the following procedures. The reaction is depicted in schematic fashion in FIG. 1.

A polymer forming solution was prepared containing styrene (10 mL), divinylbenzene (10 mL), 1-decanol (26 mL), tetrahydrofuran (4 mL) and azobisisobutyronitrile (200 mg) (AIBN) and stirred in a beaker until dissolved, then the mixture was poured into a wide container (a plastic tray). The mass of an approximately 4.5"×3.0" piece of glass fiber media was determined and recorded, and then immersed into the above prepared monomer mixture for about 7 minutes. The saturated glass fiber was removed from the tray and allowed to drip for about 1.5 minutes to remove any excess reaction mixture. The solution saturated glass fiber was placed into an appropriate container (a vented desiccator without desiccant) having a means to support the glass fiber. The container was purged with dry nitrogen for about 30 minutes to remove air from the desiccator. The purge line was removed and the desiccator vent was closed. The desiccator was then placed in an oven at 70° C. for 24 hours for the polymerization reaction. After the reaction period, the polymer modified glass fiber monolith ("PSDVB") was removed and extensively washed with methanol, water and acetone and then dried in an oven at 70° C. for 24 hours.

EXAMPLE 2

Preparation of an Amide Functionalized Polymer Modified Porous Substrate

Figure 2:
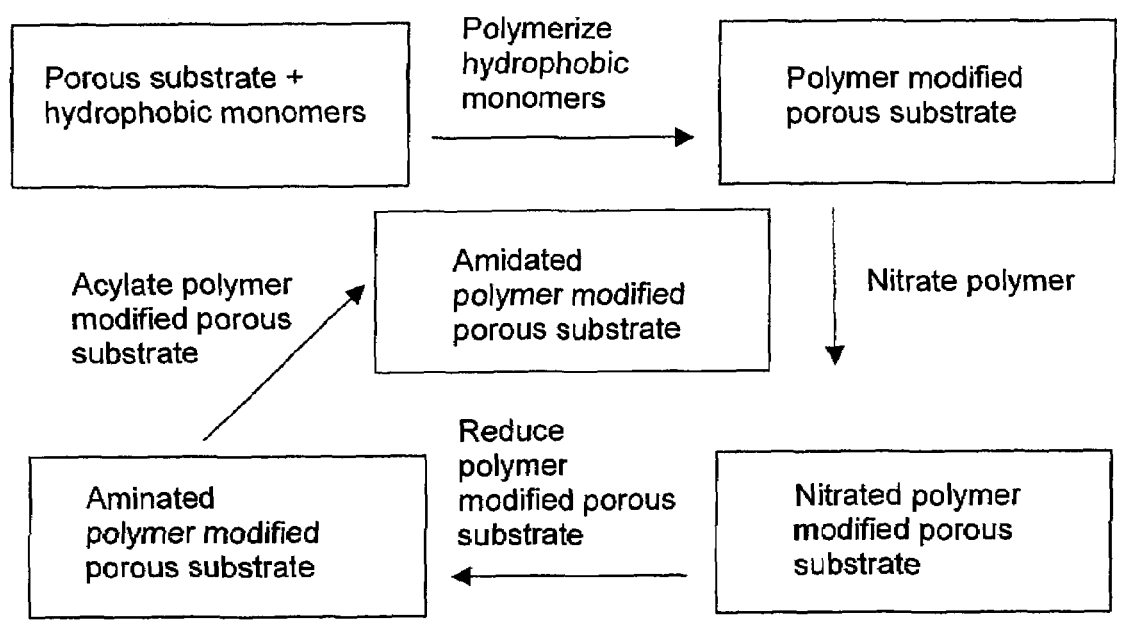
FIG. 2 illustrates a schematic for the preparation of an amide functionalized polymer modified porous substrate.

A PSDVB modified glass fiber monolith was amidated by the following procedures. The reaction is depicted in schematic fashion in FIG. 2.

A. A nitration step was performed as follows: the PSDVB modified glass fiber monolith prepared in Example 1 was suspended in concentrated nitric acid (30 molar equivalents) and the mixture was mechanically stirred. While cooling the mixture in cold water, concentrated sulfuric acid (18 molar equivalents) was added dropwise over a period of 1 to 1.5 hours, continuing the stirring at the same time. The mixture was further stirred at room temperature for three more hours. The modified glass fiber monolith was removed and immersed in water, and allowed to stand for a couple of hours, and was then washed with 2.0M NaOH, deionized water and acetone, and dried in an oven at 70° C. for 24 hours.

B. A reduction step was performed as follows: the nitrated PSDVB glass fiber monolith was suspended in glacial acetic acid, and while being mechanically stirred, was treated with a solution of stannous chloride (375 g) in 1:1 hydrochloric acid (951 mL). The mixture was stirred at room temperature for 60 hours. The polymer modified glass fiber monolith was removed from the reaction and immersed in deionized water, and washed with 1.0 M sodium hydroxide several times until all traces of tin were washed out. Then the monolith was washed with water until the wash water pH was neutral, and then was washed with acetone. The monolith was then dried in an oven at 70° C. for 24 hours.

C. An acylation step was performed at follows: The aminated PSDVB glass fiber monolith was suspended in a base (triethylamine or pyridine, excess) and with slow mechanical stirring, was treated dropwise with acetic anhydride (1.5 mole equivalent to mole of nitrogen of the aminated polymer). The stirring was continued for 3.5 hours at room temperature. The amide functionalized polymer modified glass fiber monolith ("PSDVB-NHCOCH$_3$") was removed from the reaction mixture and washed several times with 0.1M hydrochloric acid and then with deionized water, methanol and acetone. Finally, the monolith was dried at 70° C.

EXAMPLE 3

Elemental Analysis of Polymer Modified Monoliths

The amide functionalized polymer modified glass fiber monolith described in Example 2 PSDVB-NHCOCH$_3$, and the PSDVB modified glass fiber monolith prepared according to Example 1 (i.e., prior to the nitration, reduction and acetylation steps), were subjected to elemental analysis. Elemental analysis for the amide functionalized polymer modified glass fiber monolith, PSDVB-NHCOCH$_3$, showed 48.37% carbon, 4.02% hydrogen and 2.55% nitrogen, with the remaining composition being silicates. The glass fiber monolith modified with PSDVB alone had negligible nitrogen content (N<0.02%).

EXAMPLE 4

Relative Retention of Analytes by Polymer Modified Glass Fiber Monolith

A solution was prepared in 2% methanol containing the following mixture of analytes. The final concentration of each analyte was amphetamine (2500 ng/mL), ephedrine (5900 ng/mL), nortriptyline (2280 ng/mL), mianserin (2170 ng/mL), chlorpheniramine maleate (4500 ng/mL), norfluoxetine (4000 ng/mL), brompheniramine (3000 ng/mL), and quinidine (4400 ng/mL). The log P values of each analyte are as shown in Table 1 below.

TABLE 1

Log P values for various analytes

| Analyte | Log P |
|---|---|
| Amphetamine | 1.76 |
| Ephedrine | 1.61 |
| Nortriptyline | 4.74 |
| Mianserin | 3.85 |
| Chlorpheniramine maleate | 3.38 |
| Norfluoxetine | 3.75 |
| Brompheniramine | 3.89 |
| Quinidine | 2.62 |

Ninety-six well solid phase extraction plates were prepared with either PSDVB-NHCOCH$_3$ or PSDVB. Each sorbent was conditioned with 400 µL methanol and 400 µL deionized water. Then 200 µL of analyte mixture was applied to the sorbent in each well. Analytes were eluted from each sorbent using 2×100 µL aliquots of 6:3:1 methanol/acetonitrile/1% formic acid (200 µL total). A 50 µL aliquot of the pooled eluant was diluted with an additional 50 µL 1% formic acid (total volume 100 µL), and 10 µL of the diluted eluant was analyzed and quantitated by LC-MS (Varian 1200 L mass spectrometer) using a PURSUIT® C18 column (50×2.0 mm, 3 µm particle size) with the mobile phase gradient described in the table below. N=5 for each sorbent.

TABLE 2

Mobile phase gradient

| Time | % Methanol | % Formic acid (0.1%) | Flow Rate (µL/min) |
|---|---|---|---|
| 0:00 | 15 | 85 | 300 |
| 0:30 | 15 | 85 | 300 |
| 2:00 | 85 | 15 | 300 |
| 2:30 | 85 | 15 | 300 |
| 2:31 | 15 | 85 | 300 |
| 3:30 | 15 | 85 | 300 |

The retention of each analyte was plotted as a function of log P for the analyte versus % recovery from the sorbent. The retention of analytes by the PSDVB modified glass fiber monolith alone is linear across a range of log P values from about 2.5 to 5, and about 67% of each analyte having log P values in this range was recovered in the elution fractions. However, below log P values of 2.5, the recovery was reduced, with recoveries of 51% for the analyte having a log P value of 1.76, and 40% for the analyte having a log P value of 1.6, indicating that analytes having low log P values are retained as well as analytes having higher log P values by the hydrophobic PSDVB modified glass fiber monolith. In contrast, the retention of analytes by the PSDVB-NHCOCH$_3$ modified glass fiber monolith of Example 2 was linear across a range of log P values from about 1.6 to 5, and 63% to 73% of each analyte having log P values in this range was recovered.

Figure 3:
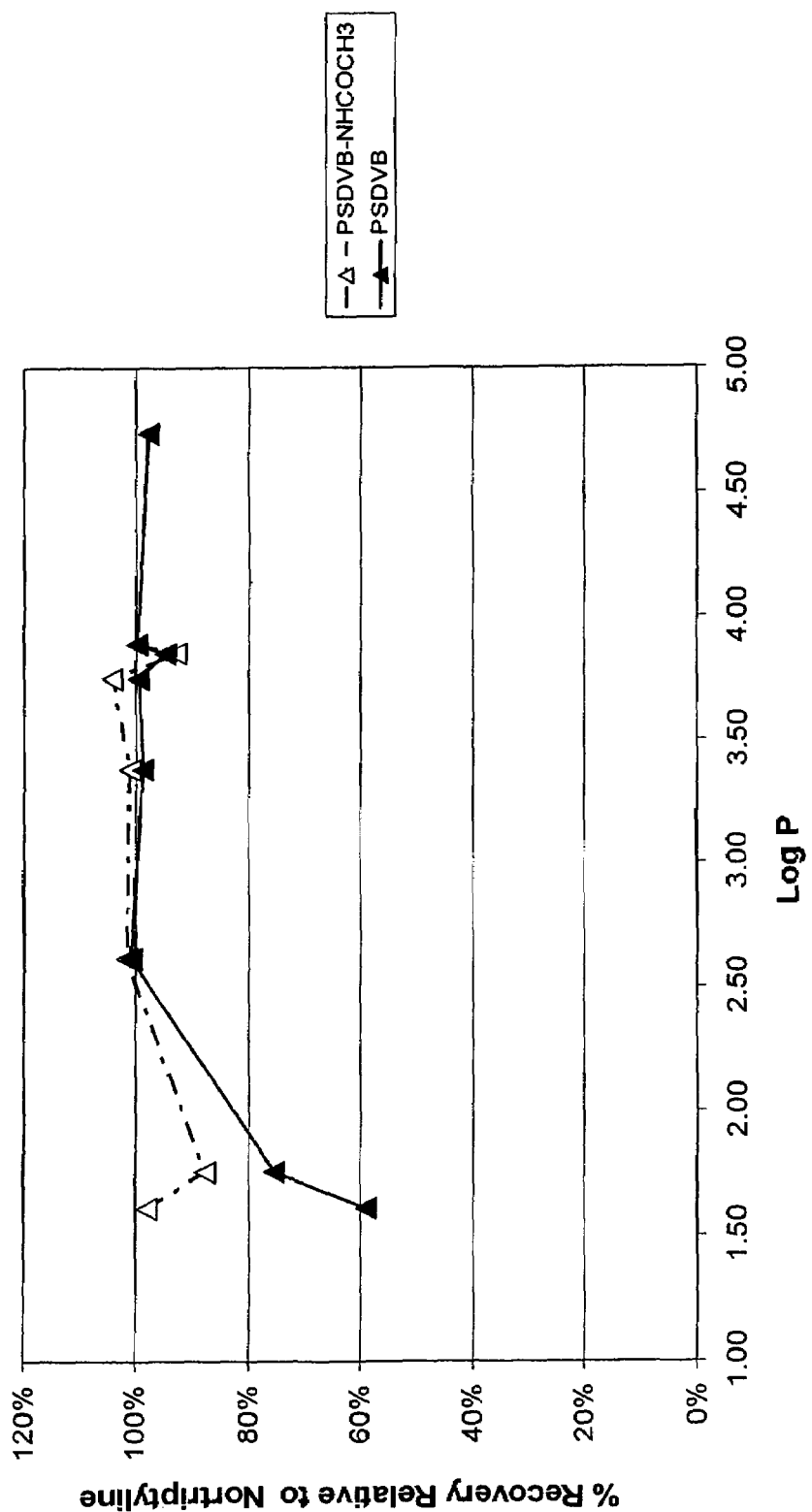
FIG. 3 illustrates the relative retention of analytes of varying polarity by various polymer modified porous substrates.

As shown in FIG. 3, when normalized to nortriptyline and expressed as relative retention, the retention of each analyte by PSDVB modified glass fiber monolith was linear across a range of log P values from about 2.5 to 5. Again, below log P values of 2.5, the retention was reduced, with relative retention of less than 80% for analytes having log P values of about 1.75, and less than 60% for analytes having log P values of about 1.6. In contrast, the relative retention of analytes by the PSDVB-NHCOCH$_3$ modified glass fiber monolith was linear across a range of log P values from about 1.6 to 5, with relative retention of most analytes being within 90% of the retention of nortriptyline.

EXAMPLE 5

Capacity of Polymer Modified Glass Fiber Monoliths for Analytes

Stock solutions were prepared containing the following mixture of polar analytes at three different concentrations: high, intermediate and low. The concentrations of analyte in each stock solution was as follows: atenolol (840, 42, 2 µg/mL), ranitidine HCl (806, 40, 2 µg/mL), salbutamol (810, 40, 2 µg/mL), bamathan hemisulfate (806, 40, 2 µg/mL), timolol maleate (823, 41, 2 µg/mL), and carisoprodol (840, 42., 2 µg/mL) at the three different concentrations, respectively. The log P values of each analyte are as shown in Table 3 below.

TABLE 3

Log P values for various analytes

| Analyte | Log P |
|---|---|
| Atenolol | 0.16 |
| Ranitidine HCl | 0.27 |
| Salbutamol | 0.97 |
| Bamathan hemisulfate | 1.29 |
| Timolol maleate | 1.83 |
| Carisoprodol | 1.96 |

Ninety-six well solid phase extraction plates were prepared with one of the two sorbents, PSDVB-NHCOCH$_3$ and PSDVB. Each sorbent was conditioned with 1 mL methanol and 1 mL deionized water. Then 500 µL of analyte solution was applied to the sorbent in each well. The eluant was collected. Another 500 µL was applied, followed by collection of the eluant. A 1500 µL aliquot was then applied to the sorbent, followed by collection of the eluant. A final 1500 µL aliquot was applied to the sorbents, and eluant was collected.

The analytes recovered in the eluates from each sorbent at each concentration applied (the analytes not adsorbed) were quantitated by LC-MS (Varian 1200 L) using a PURSUIT® C18 column (50×2.0 mm, 3 µm particle size) using a mobile phase isocratic method with 40% methanol/60% 0.1% formic acid. N=3 for each sorbent and concentration.

The capacity of each sorbent for analytes of varying polarity is presented in Table 4 below. The sorbent capacity is expressed for each sorbent as the weight of each analyte adsorbed at 30% breakthrough (i.e., when 30% of the applied analyte elutes through the sorbent without being adsorbed).

TABLE 4

Amount of analytes adsorbed by various polymer modified porous substrates

| Analyte | Log P | PSDVB | PSDVB-NHCOCH$_3$ |
|---|---|---|---|
| Atenolol | 0.16 | 0 | 0 |
| Ranitidine | 0.27 | 0 | 1.1 |
| Salbutamol | 0.97 | 0 | 0 |
| Bamathan | 1.29 | 0 | 2.0 |
| Timolol | 1.83 | 0 | 1.2 |
| Carisoprodol | 1.96 | 0 | 1.2 |

As presented in Table 4, the capacity of the PSDVB modified glass fiber monolith alone for polar analytes such as timolol and atenolol was <1 µg, and no adsorbed analytes were detected, indicating that polar analytes are not well retained by this hydrophobic sorbent.

The capacity of the PSDVB-NHCOCH$_3$ modified glass fiber monolith for polar analytes was determined and small amounts of ranitidine, bamathan, timolol and carisprodol retained (1-2 µg).

EXAMPLE 6

Comparative Analysis of Elution Characteristics from PSDVB Modified Porous Substrates The recovery of various analytes from two different polymer modified glass fiber monoliths was investigated. A mixture of analytes was prepared containing ephedrine, nortriptyline, mianserin, chlorpheniramine maleate, brompheniramine, and quinidine. Each analyte was at a final concentration of 0.1 µg/mL.

Ninety-six well solid phase extraction plates were prepared with PSDVB-NHCOCH$_3$ or PSDVB. Each sorbent was conditioned first with 1 mL methanol, and then with 1 mL deionized water. Then 0.4 mL of the mixture of analytes was applied to each monolith, and the eluant discarded. Analytes were eluted in fractions from each sorbent at total elution volumes of 25 µL, 50 µL, 100 µL, 200 µL, and 1000 µL 6:3:1 methanol/acetonitrile/1% formic acid for all sorbents. All fractions were evaporated and reconstituted in 100 µL of 15% methanol, remainder 0.1% formic acid solution.

The quantitation of each analyte eluted was determined by LC-MS (Varian 1200 L) using a PURSUIT® C18 column (50×2.0 mm, 3 µm particle size) using the mobile phase gradient described in Table 3 above. N=5 for each sorbent.

As shown in FIG. 4, the elution of analytes from a PSDVB modified glass fiber monolith indicates that the sorbent adsorbs analytes across a wide range of polarities, with similar recoveries observed for polar compounds (ephedrine) and nonpolar compounds (quinidine). Other analytes were retained longer, but eluted with similar solvent volumes. However, the rate of recovery of the analytes showed variability. Larger volumes of eluting solvent were required to elute certain analytes, and recovery was variable, with 75% to 95% of adsorbed analytes recovered after eluting with 400 µL of eluting solvent.

As shown in FIG. 5, the elution of analytes from PSDVB-NHCOCH$_3$ modified glass fiber monoliths demonstrated very good recoveries of analytes having a wide variety of polarities using low volumes of eluting solvent. Greater than 95% recoveries were observed for all analytes with 400 µL of eluting solvent.

EXAMPLE 7

Comparison of Flow Characteristics from PSDVB Modified Monoliths and a Commercial Solid Phase Extraction Filter Disk Polymer modified porous substrates were prepared as described in Example 1, using varying amounts of divinylbenzene and styrene, as indicated in Table 5 below. A commercial solid phase extraction disk, Empore™ High Performance Extraction Disks, SDB-XC, Part #12145010, was purchased and used as a comparator.

All disks were the same size (47 mm in diameter). Flow rates were determined by placing the disk into the disk holder screen side down, and the vacuum level was set at 10 inches of mercury. A valve was placed between the disk holder and vacuum source. The sample volume was 1 L of deionized water containing 5 mL methanol. To perform the test, about 3 mL of methanol was added to the disk to condition it prior to sample addition. The sample was added to the funnel of the disk holder, vacuum was applied and a timer started to record the time necessary to draw the sample through the disk. The results of the tests are shown in Table 5 below.

TABLE 5

Flow properties of various polymer modified porous substrates

| DVB mL | ST mL | Decanol mL | Dodecanol mL | THF mL | Flow rate mL/min |
|---|---|---|---|---|---|
| PSDVB | | | | | |
| 15 | 5 | 26 | — | 4 | 229 |
| 10 | 10 | 26 | — | 4 | 414 |
| 5 | 15 | 26 | — | 4 | 444 |
| Empore ™ High Performance Extraction Disks, SDB-XC | | | | | |
| — | — | — | — | — | 28 |

These results demonstrate the superior flow rates achievable using the polymer modified porous substrates described herein. The superior flow rates provide for faster sample preparation times and increased efficiencies.

What is claimed is:

1. A method for preparing a polymer modified porous substrate comprising
   (a) contacting a porous substrate with a solution comprising one or more hydrophobic monomers, a porogenic solvent and a polymerization initiator; and
   (b) heating the porous substrate and retained solution in the absence of oxygen to polymerize the one or more monomers onto the porous substrate.

2. The method of claim 1, wherein the hydrophobic monomers are crosslinkable monomers, uncrosslinkable monomers, or combinations thereof.

3. The method of claim 2, wherein the uncrosslinkable monomer is selected from vinyl or allyl substituted $C_{5-10}$ monocyclic or bicyclic aryl or heteroaryl, optionally substituted with $C_{1-12}$ branched or unbranched hydrocarbyl, halo, or combinations thereof.

4. The method of claim 2, wherein the crosslinkable monomer is selected from divinyl- or diallyl-substituted $C_{5-10}$ monocyclic or bicyclic aryl or heteroaryl moieties, optionally substituted with $C_{1-12}$ branched or unbranched hydrocarbyL halo, or combinations thereof.

5. The method of claim 1, wherein the hydrophobic monomer has the formula $CH_2$=CR -L-A-L$_r$[—CR=CH$_2$]$_r$, where L is a bond or a $C_{1-12}$ branched, unbranched, or cyclic hydrocarbyl; A is a $C_{5-10}$ monocyclic or bicyclic aryl or heteroaryl, optionally substituted with $C_{1-12}$ branched or unbranched hydrocarbyl, halo, and r is 0 or 1.

6. The method of claim 1, further comprising treating the polymer modified porous substrate to introduce a polar functionality selected from —NRC(O)—, —C(O)NR—, —OC(O)NR—, —OC(O)R, —NRC(O)O—, —NRC(O)NR—, —NCO, —CHOHCHOH—, —CH$_2$OCHCH$_2$O—, —(CH$_2$CH$_2$O)$_s$—, —(Ch$_2$CH$_2$CH$_2$O)$_s$—, —C(O)—, —C(O)O—, —CH$_2$C(O)CH$_2$—, —S—, —SS—, —CHOH—, —O—, —SO—, —SO$_2$—, —SO$_3$—, —OSO$_3$, —$SO_2NH$—, —$SO_2NR$—, —$NR_q$— and —$NR_q^+$—, where R is not H, —CN, —NC, —CHOCH—, —NHC(NH)NH—, —$NO_2$, —NO, —$OPO_3$—, —OH;

wherein s is 1-12;

q is 0-3; and

R is hydrogen, $C_{5-10}$ monocyclic or bicyclic aryl or heteroaryl, $C_{1-12}$ branched, unbranched, or cyclic hydrocarbyl.

7. The method of claim 1, wherein the porous substrate is in the form of a monolith, agglomerated particles, or woven or nonwoven fibers.

8. A method for preparing an amide functionalized polymer modified porous substrate comprising (a) contacting a porous substrate with a solution comprising one or more hydrophobic monomers, a porogenic solvent and a polymerization initiator, (b) heating the porous substrate and retained solution in the absence of oxygen to polymerize the one or more monomers onto the porous substrate to form the polymer modified porous substrate, (c) nitrating the polymer modified porous substrate to form the nitrated polymer modified porous substrate;

(d) reducing the nitrated polymer modified porous substrate to form the aminated polymer modified porous substrate; and (e) acylating the aminated polymer modified porous substrate with an acid, an acid chloride or an acid anhydride to form the amidated polymer modified porous substrate.

9. The method of claim 8, further comprising sulfonating the amidated polymer modified porous substrate.

10. The method of claim 8, further comprising treating the aminated or amidated polymer modified porous substrate to form a quaternary amine functionalized polymer modified porous substrate.

\* \* \* \* \*